March 30, 1965  C. R. MARCUM  3,176,096

MAGNETIC PROXIMITY-SENSING DEVICES

Filed Dec. 26, 1961  2 Sheets-Sheet 1

INVENTOR.
CHARLES R. MARCUM

BY *Arthur H. Robert*

ATTORNEY

March 30, 1965   C. R. MARCUM   3,176,096
MAGNETIC PROXIMITY-SENSING DEVICES
Filed Dec. 26, 1961   2 Sheets-Sheet 2
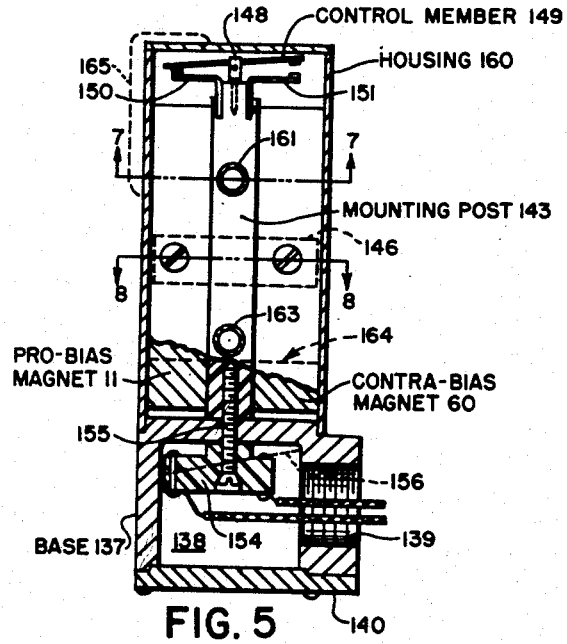
INVENTOR.
CHARLES R. MARCUM
BY Arthur H. Robert
ATTORNEY

United States Patent Office 3,176,096
Patented Mar. 30, 1965

3,176,096
MAGNETIC PROXIMITY-SENSING DEVICES
Charles R. Marcum, Jeffersontown, Ky., assignor to General Equipment & Manufacturing Company, Inc., Louisville, Ky., a corporation of Kentucky
Filed Dec. 26, 1961, Ser. No. 163,966
13 Claims. (Cl. 200—87)

This invention relates to magnetic proximity-sensing devices. A device of this type has a magnetic proximity-sensing area and depends, for operation, upon the proximity to that area of a relatively movable metal tool or other magnetically-permeable foreign element. It functions to sense the entry or exit of the foreign element into or out of its sensing area and then operate an alarm, limit switch or other work means. While the present invention is generally suited for use in operating a variety of work means, it is particularly suited for use in operating one or more electrical switches. For this reason, it is hereinafter primarily described as a magnetic proximity-sensing electrical switch.

This application is a continuation-in-part of parent application Serial No. 841,814 filed September 23, 1959 and now abandoned.

At the present time, proximity-sensing electrical switches are designed to sense the proximity of a foreign element either mechanically or magnetically. These switches include: (1) the widely used mechanical sensing limit switch which usually comprises an operating member and spring loaded electrical switch contacts, which snap open or closed when the foreign element enters the mechanical proximity-sensing area of the switch wherein the element comes close enough to the switch to engage and move its operating member through physical contact therewith; (2) the increasingly important magnetic sensing transducer switch which usually comprises magnetic means providing a normally static magnetic system, having a predetermined sensing area, and signal means, which causes an electrical signaling current to flow when a foreign magnetically permeable element enters or leaves the magnetic sensing area and thereby disturbs the normally static magnetic field system of the switch while avoiding physical contact therewith; and (3) the recently introduced magnetic sensing limit switch which comprises a pair of magnets, one on each side of the path of a foreign magnetically permeable element, each with its north pole in spaced opposed relationship to the south pole of the other magnet, and a magnetically operated switch closely associated with one magnet for operation one way (or the other) when the magnetically permeable vane-like foreign element enters (or leaves) a magnetic "sensing slot" extending more or less between all four poles of the magnets and thereby disturbs or modifies the normally static magnetic system of the switch while avoiding physical contact therewith.

The conventional mechanical proximity-sensing limit switch is relatively small and compact, low in manufacturing and installation costs, subject to mechanical failure and high maintenance costs, slow in operation, limited in operation by environmental conditions such as the presence of metal chips or of liquid medium used to cool a cutting tool, physically actuated and of low life expectancy. The conventional magnetic proximity-sensing transducer switch, commonly called the proximity switch, is large, high in manufacturing and installation costs, completely reliable in operation but subject to high costs on maintenance calls, fast in operation, magnetically actuated, capable of operating in adverse environment and of long life expectancy. The magnetic proximity-sensing limit switch of the magnetic sensing slot type tends to combine the advantages of the mechanical proximity-sensing limit switch and the magnetic proximity-sensing current-inducing switch.

The principal object of the present invention is to provide a magnetic proximity-sensing device of substantially improved construction and operation which is small and compact in size, low in manufacturing, installation and maintenance costs, completely reliable and fast in operation, magnetically actuated, capable of operating in adverse environments and of long life expectancy.

In a paper entitled "Limit Switches Versus Proximity Switches On Machine Tools" presented at the 23rd Annual Machine Tool Electrification Forum held on April 14 and 15, 1959 at Buffalo, N.Y., one author rated the three aforementioned switches on a first, second and third place basis as indicated in columns 1, 2 and 3 of a Table I which follows:

TABLE I

| Merits | Proximity-sensing Devices | | | |
|---|---|---|---|---|
| | Mechanical Sensing Limit Switch | Magnetic Sensing Transducer Switch | Magnetic Sensing Limit Switch | |
| | | | Sensing Slot Type | Sensing End Type |
| | Col. 1 | Col. 2 | Col. 3 | Col. 4 |
| 1. Reliability | 2 | 1 | 1 | 1 |
| 2. Simplicity | 1 | 3 | 1 | 1 |
| 3. Positiveness | 1 | 3 | 2 | 2 |
| 4. Fail-Safe | 1 | 3 | 2 | 2 |
| 5. Foolproof | 1 | 3 | 2 | 2 |
| 6. Accuracy | 1 | 3 | 2 | 2 |
| 7. Fast Operation | 3 | 1 | 2 | 1 |
| 8. Size-Sensing Unit | 2 | 1 | 3 | 1 |
| 9. Size-Total | 1 | 3 | 2 | 1 |
| 10. Cost | 1 | 3 | 2 | 1.5 |
| 11. Mounting and Wiring | 1 | 2 | 1 | 1 |
| 12. Suitable For Adverse Environment | 3 | 1 | 2 | 1 |
| 13. Adequate Number of Contacts | 1 | 2 | 3 | 2 |
| 14. Power Handling Capacity | 1 | 2 | 3 | 2 |
| 15. Snap Action | 1 | 2 | 2 | 1.5 |
| 16. Small Differential | 1 | 3 | 2 | 2 |
| 17. Low Operating Force | 2 | 1 | 1 | 1 |
| 18. Sensing Without Physical Contact | (−) | (1) | (2) | (1) |
| 19. Provision For Overtravel | 2 | 1 | 1 | 1 |
| TOTAL (Omitting 18) | 26 | 38 | 35 | 26 |
| RATING | 1st | Close 3rd | Poor 2nd | |

Another important object of the present invention is to provide a magnetic proximity-sensing device, which, in respect to the items rated in Table I, columns 1–3, compares favorably with the mechanical sensing limit switch of column 1 and is correspondingly superior to the other switches listed in columns 2 and 3.

One embodiment of a magnetic proximity-sensing device made in accordance with my invention for use with a magnetically permeable foreign element which is relatively movable into and out of the sensing area of the device, comprises:

(1) a frame;

(2) a magnetically permeable control member mounted on the frame for movement between first and second positions;

(3) a pro-bias magnet stationarily mounted on the frame with a pole of one magnetic sign positioned adjacent one end of the control member to establishe a magnetic system having a first foreign element proximity-sensing area adjacent that one end of the control member and a magnetic bond between that one end and said pole, which sensing area and bond are both remote from a permanent magnetic pole of opposite sign, (a) said bond continuously urging that one end of said control member in the direction of its first position with a yieldable pro-bias force, which, with the control member in its first position, is of one strength when said foreign element is out of said first sensing area and of different strength when said foreign element is in said first sensing area wherein it modifies the strength of the magnetic field acting on said one end of said control member, the pro-bias force of greater strength being effective to hold it in its first position;

(4) contra-bias means mounted on said frame for continuously urging said one end of said control member in the direction of its second position with a yieldable contra-bias force, which, with the control member in its first position, is of relative intermediate strength regardless of the position of said foreign element relative to said first sensing area, said contra-bias force of intermediate strength being automatically effective, when opposed by the smaller of said pro-bias forces, to institute the movement of said control member toward said second position; and (5) work means operatively associated with the control member to be actuated thereby upon a given movement thereof relative to its first and second positions and operative, when actuated, to perform a given useful function.

In a magnetic proximity-sensing electrical switch, the work means may comprise an electrical switch means including an electrical switch contact connected to the control member for movement between switch-open and switch-closed positions as the control member moves between its first and second positions.

My device, when designed as a magnetic proximity-sensing electrical switch of presently preferred form, employs a soft iron foreign element, a soft iron control member in the form of a centrally pivoted armature, a pro-bias permanent magnet having its pole of one magnetic sign acting on one end of the armature to provide an adjacent pro-bias bond and first sensing area, both of which are remote from any permanent magnetic pole of opposite magnetic sign, and a contra-bias permanent magnet having its pole of the same one magnetic sign acting on the other end thereof, and armature-controlled contact switch means. In this arrangement, the strength of the pro-bias magnet is dominant when the foreign element is out of the sensing area while the strength of the contra-bias magnet is dominant when the foreign element is in the sensing area.

I believe that, in respect to the items rated in Table I, my preferred form of magnetic proximity-sensing electrical switch compares in the favorable manner indicated in Column 4 thereof and is correspondingly superior to the other two magnetic switches listed. My arrangement enables the sensing area of the switch to be located on the unobstructed perimeter of the switch, where it can accommodate a foreign element movement from most any direction. It has medium power handling capability with excellent sensitivity, small differential and accurate repeatability.

The invention, as illustrated in the accompanying drawings, embraces devices having contra-bias means in the form of springs as well as permanent magnets. In said drawings.

Figure 1:
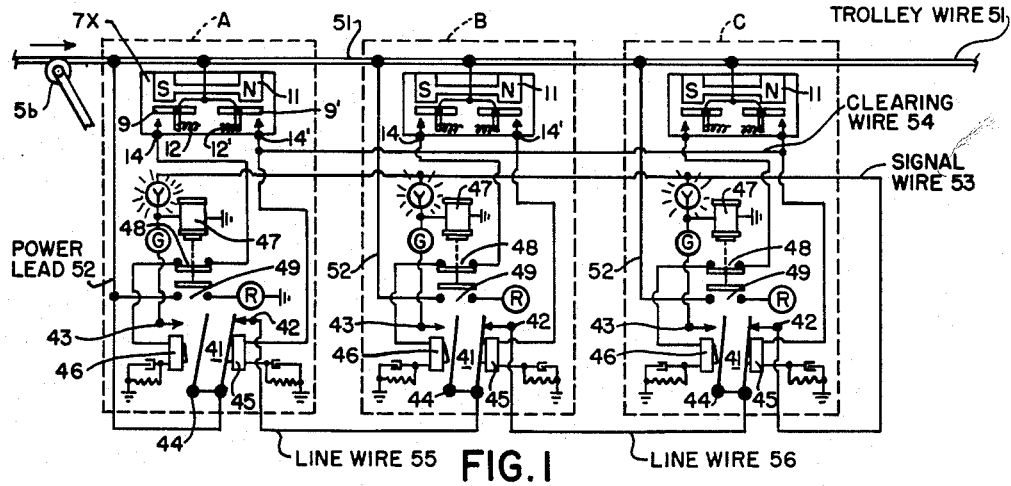
FIG. 1 illustrates one form of spring contra-bias switch constructed in accordance with my invention and used as an entrance-exit switch in a block-signaling system.
Figure 3:
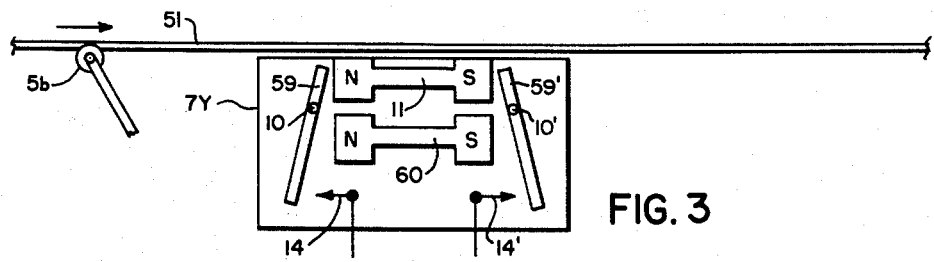
Figure 4:
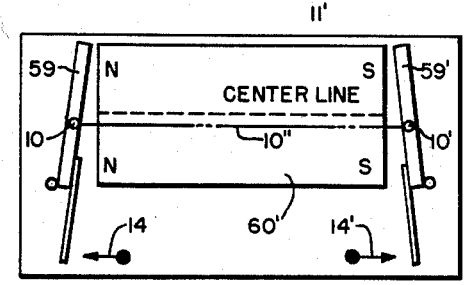

FIGS. 3–4 disclose two additional modifications of the entrance-exit switch of FIG. 1, these switches replacing the contra-bias spring with a contra-bias magnet;

FIG. 5 shows a preferred embodiment of my invention in the form of a magnetic contra-bias switch hermetically sealed within a casing, one side of which is cut away to show the upper part of the switch mechanism in elevation and broken away to show the lower part of this embodiment in vertical central section;

FIG. 6 is a bottom plan view of the construction shown in FIG. 5 with the cover off;

FIGS. 7 and 8 are sections taken along lines 7—7 and lines 8—8 respectively of FIG. 5;

FIGS. 9–14 are schematic views illustrating the operation of my device when designed for use as an electrical switch of the latching or maintained-contact type.

*FIGS. 1–4.—MPS entrance and exit switches for railway block signal systems*

*Block signal system of FIG. 1.*—The block signal system of FIG. 1 embraces three separate entrance-exit stations A, B and C, each having, when the block is not occupied, an energized yellow lamp Y, and de-energized (or dark) green and red lamps G and R. An MPS switch 7x is provided at each station. Each switch is termed a double MPS switch because it has a pair of independently operating control members 9 and 9' arranged to cooperate with a single or common pro-bias permanent magnet 11. One control member 9' is located at the northpole end (N) of magnet 11 and the other 9 at the southpole end (S) thereof.

The MPS switch 7x, used at each of the three A, B and C stations of FIG. 1, provides the requisite entrance and exit switches 14, 14' for a block signaling system of the character shown in my U.S. Patent No. 2,740,040, which comprises: (1) a relay 41 at each station, having normally closed "yellow" circuit and normally open "green" circuit contacts 42 and 43 on one side with a common terminal 44 on the other side and first and second relay coils 45 and 46; (2) a normally energized electromagnet 47 at each station, controlling a normally closed entrance-circuit switch 48 and a normally open "red" circuit switch 49; (3) a pair of vehicle-responsive MPS switches at each station, one providing a normally open entrance switch 14 and the other a normally open exit switch 14'; (4) a trolley power line 51 having a lead wire 52 extending into station A; (5) a signal wire 53 interconnecting the power side of all electromagnets 47; (6) a clearing wire 54 interconnecting the exit switch contacts 14' of all exit MPS switches; (7) a line wire 55 interconnecting "yellow" circuit contact 42 of station A with common terminal 44 of station B; and (8) a line wire 56 interconnecting "yellow" circuit contact 42 of station B with common terminal 44 of station C.

With this arrangement, when the block is clear, a "yellow" circuit is energized from trolley wire 51 through power lead line 52, the "yellow" side of relay 41 of station A, interconnecting line 55, the "yellow" side of relay 41 of station B, interconnecting line 56, the "yellow" side of relay 41 of station C, signal wire 53 and the "yellow" lamp lines of all three stations in parallel, each line including lamp Y, electromagnet 47 and ground. When a train approaches the block entrance at station A, and reaches the sensing area of the entrance MPS switch 7x for that station, the trolley wheel or shoe of the train functions as a foreign magnetic element 5b which weakens the magnetic bond between pro-bias magnet 11 and control member 9 to permit spring 12 to close MPS switch contact 14 momentarily and thereby momentarily energize the station A entrance circuit, which extends from trolley wire 51 successively through control member 9, entrance switch 14, closed relay contact 48, second relay coil 46 and a condenser-resistor leakage unit to ground. This charges the condenser of the leakage unit to render this entrance circuit inoperative until the charge is sufficiently dissipated by the resistor of the unit. It also charges the condenser of the exit circuit (51, 9', 14', 41, leakage-unit, ground) by a connection which has been omitted for the sake of clearness, and thus prevents the entering trolley from energizing the exit circuit.

This operates relay 41 of station A to open the "yellow" circuit and thereby extinguish all "yellow" lamps and to close the "green" circuit of station A which extends from trolley wire 51 successively through the "green" side of relay 41 (or green contact 43), "green" lamp G and electromagnet 47 to ground. Since the "yellow" circuit, which extends from one station to another, has been de-energized and since the individual "green" circuits of stations B and C have not been energized, then, at each of the B and C stations, the relay switch 48 opens the entrance-switch circuit, which is also open at entrance switch 14, while the adjacent relay switch 49 closes the individual "red" circuits of stations B and C, each "red" circuit extending from trolley wire 51 successively through power lead line 52, switch 49 and "red" lamp R to ground.

It is again noted that, in FIG. 1, the magnetic power of a single pro-bias magnet 11 operates both of the entrance and exit MPS switches, the entrance circuit switch of contact 14 using the south pole end "S" of that magnet and the exit circuit switch of contact 14' using the north pole end "N" thereof. An arrangement of this character may, on occasions, be subject, at one time, to the false tripping of one MPS switch in the absence of trolley wheel 5b and, at another time, to the failure of the other MPS switch to operate in the presence of trolley wheel 5b due, in each case, to the magnetic field set up around trolley wire 51 by the heavy line currents in that trolley wire. For example, the trolley line current, which will always be in one direction, will establish a unidirectional magnetic field around the trolley wire. The direction of this field may be assumed to be such as to oppose the south pole of the pro-bias magnet 11 in the entrance MPS proximity switch and thereby weaken the magnetic bond between that pole and the control member 9 so as to render the spring 12 effective to operate the proximity switch 14, in the absence of the trolley 5b of an entering train.

Similarly that same magnetic field may strengthen the bond between the north pole end "N" of magnet 11 and the control member 9' of the exit MPS switch sufficiently to prevent the spring 12' closure of exit circuit switch 14' when a train trolley wheel 5b passes the exit MPS switch 7x. In other words, when a train comes out of the block, the foreign element trolley 5b will weaken the magnetic bond of the exit MPS switch 7x and, under normal operating conditions, thus render the spring 12' operative to close the exit circuit switch 14'. But under abnormal operating conditions, the magnetic field of the trolley line wire current may strengthen the pro-bias magnetic bond of the exit MPS switch 7x enough to prevent the closure of exit circuit switch 14' by spring 12', when trolley wheel 5b weakens that bond.

Figure 2:
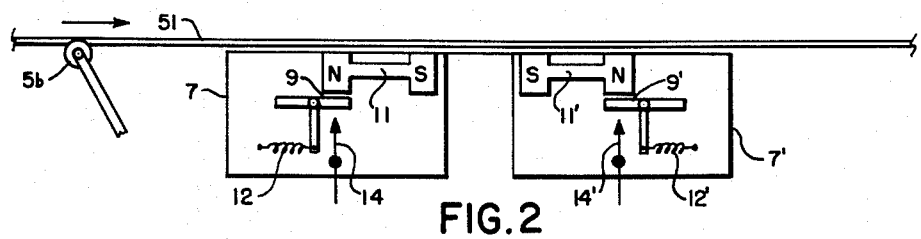
FIG. 2 illustrates another slightly modified form of the spring contra-biased switch shown in FIG. 1.

*System of FIG. 2.*—FIG. 2 discloses an MPS switch arrangement similar to that of FIG. 1 except that each of two separate MPS switches 7, 7' has its own pro-bias permanent magnet 11, 11' and these permanent magnets are all arranged to use the same polarity for the magnetic bond with the control members 9. In other words, both control members 9 and 9' are associated with magnetic poles of the same polarities, the north poles "N" being used in FIG. 2. As a consequence the magnetic field of the trolley line wire 51 may be assumed to be in a direction such as to strengthen the pro-bias bond in both MPS switches and thus prevent the false tripping of each MPS switch 7, 7'. In such case, however, the FIG. 2 arrangement remains subject to the possibility that the magnetic pro-bias bond of each MPS switch may be strengthened too much, i.e., strengthened sufficiently to prevent the normal closure of each switch in response to the passage of the foreign magnetic trolley element 5b of a passing train.

If the magnetic field of the trolley line current in FIG. 2 is in the reverse direction, it would weaken both pro-bias magnetic bonds and thereby render both MPS switches 7, 7' fully responsive to a passing trolley element 5b but subject both MPS switches 7, 7' to false tripping in the absence of element 5b.

*System of FIG. 3.*—The FIG. 3 system is designed to overcome both deficiencies of the FIG. 2 system. This is accomplished by magnetically counterbalancing the magnetic bonds of pro-bias magnet 11 with the entrance and exit control members 59 and 59' through the agency of a counterbalancing magnet 60 which in relation to pro-bias magnet 11, is (a) placed in parallel therewith, (b) located on the other or opposite side of the pivots 10 of control members 59 and 59' and (c) arranged to provide the same magnetic polarity in each MPS switch and thereby attract the control members 59 and 59' in opposition to their attraction by the pro-bias magnet 11. The counterbalancing or contra-bias magnet 60 may be of the same strength as the pro-bias magnet 11 or it may be and preferably is of slightly different effective strength obtained by making pro-bias magnet 11 slightly longer than the counterbalancing magnet 60 so that the north pole and south pole ends N and S of the pro-bias magnet 11 normally lie closer to their respective control members 59 and 59' than do the N and S ends of counterbalancing magnet 60.

With this arrangement, the magnetic field created around the trolley line wire 51 by the line current will strengthen (or weaken) the magnetic north pole bonds of both pro- and contra-bias magnets 11 and 60 in one switch and reversely weaken (or strengthen) the magnetic south pole bonds of both pro- and contra-bias magnets 11 and 60 in the other proximity switch. Furthermore, both north pole bonds will be strengthened (or weakened) to about the same extent while both south pole bonds will likewise be reversely weakened (or strengthened) to about the same extent. Consequently, the FIG. 3 arrangement will preserve substantially the same magnetic differential between the north pole bonds of the pro- and contra-bias magnets regardless of the varying line current conditions which create a correspondingly varying field around the trolley wire 51.

To make this clear, we assume, in the complete absence of any line current: (a) that the north pole of the counterbalancing or contra-bias magnet 60 normally attracts control member 59 on the one side of the pivot 10 with a contra-bias magnetic force of 9 units; (b) that the north pole of pro-bias magnet 11 normally attracts the same control member 59 on the other side of its pivot 10 with a pro-bias magnetic force of 10 units; (c) that the resulting differential of one unit, which is a pro-bias differential favoring pro-bias magnet 11, is sufficient to move control member 59 in a direction proceeding away from the contra-bias magnet 60 and toward that pro-bias magnet 11; (d) that, when the trolley wheel 5b is in the sensing area of the switch, which is adjacent the north pole of pro-bias magnet 11, it is effective to divert 2 units of magnetic force away from the pro-bias magnetic north pole bond between pro-bias magnet 11 and control member 59 and thus reduce the strength of the pro-bias bond from 10 units to 8 units; and (*e*) that the resulting differential of one unit, which is now a contra-bias differential favoring magnet 60, is sufficient to move control member 59 in a direction proceeding away from the pro-bias magnet 11 and toward the contra-bias magnet 60.

We now assume that a line current is flowing through trolley wire 51 and that it sets up a magnetic field, the direction of which is such as to strengthen the magnetic N pole pro-bias bond, of an entrance MPS switch of the type shown in FIG. 3, by 3 units so as to raise its 10 unit value to 13 and its 8 unit value to 11. By the same token, this same extraneous field will also strengthen the magnetic N pole contra-bias bond by approximately 3 units so as to raise both of its 9 unit values to 12. From this, it should be clear that, at the entrance MPS switch, the pro-bias differential (of either 10 less 9 or 13 less 12) in the absence, and the contra-bias differential (of either 9 less 8 or 12 less 11) in the presence, of trolley 5b will normally be substantially unaffected by a trolley line magnetic field.

The foregoing is true of the exit MPS switch of FIG. 3 which is formed by control member 59' and contact 14' operating at the south pole ends of pro-bias magnet 11 and contra-bias magnet 60. This exit MPS switch operates identically to the entrance MPS switch of FIG. 3 except that the magnetic south pole pro-bias and contra-bias bonds, of 10 and 9 units respectively and of 8 and 9 units respectively, are all weakened to the same extent by the magnetic field of the trolley line current.

The foregoing remains true of each of the two single MPS switches, which result when the entrance half of the FIG. 3 switch is separated from the exit half thereof.

In the operation of the block system of FIG. 1, using MPS switches 7y of FIG. 3 as entrance and exit switches, it will be understood that such MPS switches will assume the open "pro-bias" positions illustrated in FIG. 3 when a trolley 5b is in its inoperative position. However, when an approaching trolley 5b reaches the sensing area of the entrance MPS switch, where it becomes effective to divert magnetic flux from the bond between control member 59 and the north pole N of pro-bias magnet 11, it will simultaneously become effective to reverse the pro-bias magnetic differential rendering contra-bias magnet 60 effective to close entrance switch 14. If this trolley 5b is operating at station B, the closure of station B's entrance switch 14 will establish a green light for station B and red lights at stations A and C. As an exiting trolley 5b (in leaving the block at any station, e.g., station B) passes the exit MPS switch 7y, it will reverse the normal pro-bias differential of that switch rendering contra-bias magnet 60 operative to close the exit MPS switch contact 14' and thereby clear the signals at all stations causing the yellow circuit for all stations and the yellow lamp at each station to be energized.

It will be appreciated that an MPS switch constructed in accordance with my invention to use pro-bias and contra-bias magnetic differentials, may be reliably used in the presence of various extraneous magnetic fields. Thus, it may be used in any of a variety of machine-controlling applications (or other applications) alongside welding or other equipment, the welding or operative currents of which may establish varying or steady extraneous magnetic fields which, many times, may be of great strength.

Furthermore, an MPS switch of this character will operate with consistent reliability when placed adjacent one or between two magnetically permeable members such as steel plates. These plates may also rob the switch of some of its magnetic flux but the switch will normally continue to work satisfactorily because the plates will rob all of the magnetic bonds either equally or to an extent insufficient to destroy the effectiveness of its magnetic differentials.

*System of FIG. 4.*—It will be understood that the MPS switch of FIG. 4 operates exactly in the same manner as that of FIG. 3. In FIG. 4, a single magnet is used. To emphasize the differential effect somewhat, the longitudinal center of the magnet, which is indicated by the dotted line, is offset from line 10'', which passes through the centers of the control member pivots 10 and 10', whereby the pro-bias section 11' of the magnet is slightly more than one-half of the whole magnet while the contra-bias section 60' is slightly less. Where only a single switch is desired, the control member 59 at one end or 59' at the other may be omitted.

MPS Switch Embodiment of FIGS. 5–8

This embodiment comprises: a base; an MPS switch mechanism; means rigidly securing that mechanism to the base; and a housing cooperating with the base to enclose the switch mechanism.

*Base.*—The base 137 may be composed of any suitable non-magnetic material such as metal, plastic and the like. Preferably, it is composed of a solid block of non-magnetic metal such as brass, which is bored vertically from its bottom side to provide a chamber 138 of inverted cup shape and from one side to provide an access passageway 139. The bottom side of this base is closed by a cover 140 while its access passageway preferably is threaded for connection to a suitable conduit.

*Switch mechanism.*—The switch mechanism comprises: a magnet assembly including pro- and contra-bias magnets; a control member; and switch contacts.

The magnet assembly, which could be provided by a single magnet as in FIG. 4, is illustrated as being composed of a mounting post and two separate permanent magnets mounted thereon. The mounting post is illustrated as a center upright post 143, which may be composed of any suitable material, preferably one which is not magnetically permeable, such as brass, pressed fiber board or the like. In the construction shown, the post 143 is composed of an electrical insulating material. Vertically elongated pro-bias and contra-bias magnets 11 and 60 are vertically arranged adjacent the post on opposite sides thereof.

The magnets are mounted on the post for limited vertical adjustment by providing the post with a horizontally arranged see-saw 146 suitably pivoted thereto and by pivotally securing the mid-portions of the magnets 11 and 60 to opposite ends of the see-saw 146. This arrangement is initially employed because it enables these magnets to be adjusted vertically to an operative position providing the desired magnetic differential at their upper ends. Both magnets are arranged to present the poles of the same sign at their upper ends.

The top of the post carries a fixedly mounted bracket 148 and a horizontally extending magnetically permeable armature or control member 149, the center of which is pivoted to the bracket 148 so as to be balanced thereon. The post also carries separate contactors 150 and 151, one for each end of the control member 149. Each contactor is fixedly mounted on the upper end of the post, and arranged to extend horizontally outward underneath the adjacent end portion of the control member. Each contactor and the adjacent end portion of the control member are provided with a pair of cooperating electrical switch contact points so arranged that, when the contact points at one end are closed, those at the other end are open.

*Switch mechanism mounting means.*—The switch mechanism may be readily secured to project upwardly from the top side of the base by positioning an electrical connector block 154 centrally within chamber 138 of the base 137 and passing a securing screw 155 upwardly through the center of the connector block 154, the top of the base 137 and the lower end portion of the center post 143. This connector block has at least three electrical terminal connections, two of which are indicated in FIG. 5 and all three of which are indicated in FIG. 6.

All three terminal connections are permanently connected by electrical wires (not shown) extending from such connections upwardly through a suitable hole in the top wall of base 137, one connection going to the bracket 148 or the pivot of the control member 149 and the other two going to the contacts 150, 151. With this arrangement, the opening in the ceiling of base chamber 138, through which these electrical connections extend, may be closed and sealed by inverting the base, tilting it slightly and pouring a suitable resinous or other plastic sealing compound into the base chamber so that it will solidify in the available space existing between the ceiling of that chamber and the dotted line 156 shown in FIG. 5.

The construction is now set upright and its magnets are adjusted, one magnet up and the other down, until a desired operating position is accurately achieved. The magnets are then initially anchored in the desired operating position by tightening the brass screws securing the see-saw to the centering post and the magnets.

*Housing.*—To enclose the switch mechanism, a cup-shaped brass housing 160, preferably square in horizontal cross section, is inverted over the switch mechanism. When this housing is in position to have its lower end soldered, brazed or otherwise secured to the base, an upper transverse opening in the center post of the switch mechanism will be transversely aligned with openings in opposed walls of the housing. At that time, an upper sleeve 161 is extended through one wall of the housing, the center post and then the other wall of the housing and thereupon the lower end of the housing and the opposite ends of that sleeve 161 are soldered, brazed or otherwise secured in place.

The center post and opposite walls of the housing also have transversely aligned openings to receive a lower sleeve 163. But, before this lower sleeve is inserted, plastic sealing material, preferably resinous, is poured through one of the sleeve-receiving housing-openings so that it will ultimately solidify in the available space existing between the bottom wall of the housing and the dotted line 164 shown in FIG. 5. This plastic will operate to anchor the lower ends of both magnets firmly in place and cooperate with the plastic in the upper end of the base chamber to seal the housing side of the openings existing between the base and housing interiors. When the lower sleeve 163 is positioned and soldered or brazed to the housing, the entire switch mechanism will be hermetically sealed within the housing. The switch may be mounted by suitable securing screws passing through said sleeves.

*Operation.*—In operation, the switch mechanism will normally occupy the pro-bias position shown in FIG. 5 so long as the foreign element remains out of the sensing area. While the extent of the sensing area may vary from that indicated by dotted line 165 in FIG. 5, as indicated, it normally extends, on the "left" or pro-bias half of the housing, from the top "left" corner of the housing horizontally along the top wall thereof to a point corresponding to the middle of the pro-bias half of the control member 149, and vertically along the outer "left" side wall thereof downwardly to a point corresponding to the middle of the upper half of the pro-bias magnet. The width of the sensing area will normally be slightly greater than the width of the pro-bias magnet 11 (i.e., its vertical dimension in FIG. 7) and substantially less than the corresponding vertical dimension between the housing side walls at the top and bottom of FIG. 7.

Since the control member and both magnets are all on the same side of the sensing area, the space on the other side of that area may be left completely unobstructed to accommodate any of a wide variety of different paths of foreign element movement.

However, when a foreign magnetic element enters this sensing area either horizontally or vertically it will disturb the magnetic system, weaken the magnetic bond between pro-bias magnet 11 and the corresponding end of control member 149 and thereby shift the magnetic differnetial in favor of the contra-bias magnet 60 causing it to move control member 149 in a direction opening contact 150 and closing contact 151. Once this motion starts, it will continue; hence, the armature snaps from its first position to its second position. It will return to its first position in like fashion when the foreign element leaves the sensing area.

It will be appreciated that this MPS switch combines most of all of the desirable or necessary characteristics of the conventional mechanical proximity-sensing switch and the magnetic proximity-sensing transducer switch. It is like the mechanical switch in that it is provided with a self-contained set of contacts that operate in response to the actuating means provided. It is like the conventional proximity switch systems in that it is magnetically actuated without physical contact; hence, has unlimited overtravel capabilities.

This MPS switch design is sturdy, shock resistant, completely reliable, fail-safe, simple, compact, reasonably low in cost, easy to mount and wire and suitable for use in adverse environments. It has a S.P.D.T. contact arrangement with medium power handling capabilities, excellent sensitivity, small differential, accurate repeatability and long life expectancy. It is suitable for use close to or upon resistance welders and normally will not false trip. It requires no power input and, since the entire assembly is hermetically sealed within a sturdy brass housing, complete freedom from the entrance of moisture, oils, etc., is assured throughout its long life expectancy which is unlimited unless the switch is abused.

I have obtained excellent results with a hermetically sealed brass housing switch of the type shown in FIGS. 5–8 dimensioned 1½" x 1½" x 4½". This switch has single pole double throw switch contacts rated at 2.0 amperes and 125 volts A.C. Its sensitivity ranged from ⅛" to ⅝" being normally factory set at ⅜". Its repeatability was within .002" of the set operating point while its differential was ⅜". Its temperature range extends at least from −50° to 250° and the sealing compounds used should remain solid in this range.

While spring and magnetic contra-bias arrangements have been illustrated and described, it will be understood that gravitational biases may be employed as by suitably weighting the contra-bias end of a control member such as control member 149 or suitably offsetting it. It will be appreciated that the switch means constitutes a work means which is operatively associated with the control member to be actuated thereby upon the movement thereof toward one of its positions and which is operative, when actuated, to perform a given useful function such as opening or closing a switch.

An MPS device embodying my invention essentially includes a basic unit comprising said frame, control member, pro-bias magnet, and contra-bias means. In each of the embodiments embraced by FIGS. 1–8, the movement of the basic unit control member is utilized to actuate an electrical switch work means which operates or controls the operation of something else.

*MPS latching device of FIGS. 9–14*

The MPS devices of FIGS. 1–8 all have a contra-bias force supplied either by a spring or a permanent magnet and all are designed to move the armature from its first position to its second position automatically when the first foreign element moves into the first sensing area and to move the armature automatically out of its second position and back into its first position upon the exit of the first foreign element out of the first sensing area. This is accomplished by making the pro-bias force exceed the contra-bias force when a first foreign element is out of the first sensing area and by making the contra-bias force exceed the pro-bias force when the first foreign element is in the first sensing area.

I have found, however, that an MPS device of the type using pro-bias and contra-bias magnets will operate as a latching or "maintained position" device if the magnitudes of the different contra-bias forces are made to approximate the magnitudes of the corresponding pro-bias forces and thereby set up equivalent first and second sensing area, one at each end of the control member. An arrangement of this character requires, for its full operation, the entry and exit of a foreign element into each sensing area.

The arrangement by which an MPS device may be made to operate as a latching or maintained position device, may be readily explained upon a reference to FIGS. 9–14, which show basic unit parts comprising: a control member or armature 200; a pro-bias magnet 201 cooperating with the control member to establish a first sensing area 202 and a contra-bias magnet 203 cooperating with a control member 200 to establish a second sensing area 204.

In FIG. 9, the basic unit is in its second position wherein we assume that the strength of the pro-bias force is 20 units while that of the contra-bias force is 25 units. In other words, the pro-bias magnet tends to rotate the armature 200 out of its second position with a force of 20 units while the contra-bias magnet successively tends to hold the armature in its second position with a force of 25 units.

FIG. 10 illustrates what happens to these forces when the armature 200 is forcibly made to remain in its second position while a second foreign element 206 is introduced into the second sensing area. In this case, the contra-bias force will be reduced to a value which we assume equals 15 units. We also assume that the pro-bias force remains unchanged although we recognize that a second foreign element in the second sensing area may weaken the pro-bias force somewhat. Since the pro-bias force of 20 units in FIG. 10 is higher than the contra-bias force of 15 units, the armature will automatically move to its first position when it is released from the restraint which held it in its second position.

FIG. 11 illustrates what happens to the pro-bias and contra-bias forces of FIG. 9 when the second foreign element 206 moves into the second sensing area. The contra-bias force will be reduced from 25 units to an assumed value of 10 units while the pro-bias force will be increased from 20 units to an assumed value of 25 units. As a result, the armature will be automatically snapped from its second position to its first.

FIG. 12 shows the character of the change which may be expected to take place when the second foreign element 206 is removed from the second sensing area. This removal results in an increase in the contra-bias force from 10 to 20. We assume the pro-bias force remains at 25 although we again recognize that it may be strengthened by the removal of the second foreign element from the second sensing area. Since the 25 unit pro-bias force remains stronger than the 20 unit contra-bias force, the armature will remain in its first position.

FIG. 13 demonstrates what happens to the pro- and contra-bias forces when the control member 200 is forcibly retained in its first position while a first foreign element 205 is introduced into the first sensing area. The pro-bias force is now reduced from 25 units to the assumed value of 15 units. We again recognize that the contra-bias force may also be weakened somewhat but we assume that it remains the same.

FIG. 14 demonstrates the changes which occur in the pro-bias and contra-bias forces when the armature is permitted to move from its first position back to its second position upon the entry of first foreign element 205 into the first sensing area. Here, as indicated, the pro-bias force drops to 10 units while the contra-bias force rises to 25 units.

From the foregoing, it will be clear that an MPS device, having pro-bias and contra-bias magnets and first and second sensing areas of equivalent strength and disposition under corresponding conditions, will operate as follows: it will remain in its first position so long as a first foreign element remains out of the first sensing area; it will automatically move out of its first position and into its second position upon the entry of a first foreign element into the first sensing area; it will remain in its second position (regardless of the exit or reentry of a first foreign element from or back into the first sensing area) so long as a second foreign element remains out of the second sensing area; it will automatically move out of its second position and back into its first position upon the entry of a second foreign element into the second sensing area; and it will remain in its first position (regardless of the exit or reentry of the second foreign element from or back into the second sensing area) so long as the first foreign element remains out of the first sensing area.

It should be understood that the numerical values given to the pro-bias and contra-bias forces above noted are fictitious values assumed for the purpose of illustration and are not based upon any measurement of such forces. It should suffice to say that I have obtained excellent results with my MPS device as a latching or maintained position device using pro-bias and contra-bias magnets of substantially equal strength and arranging them to occupy substantially equivalent positions on opposite sides of the axis of the control member.

We may say that the foreign element used in connection with the description of FIGS. 1–14 is of the soft iron type. However, a foreign element of the permanent magnet type may be used in the first sensing area either to strengthen or weaken the pro-bias force.

Furthermore, where a second sensing area is used, the permanent magnet type of foreign element may also be used there to strengthen or weaken the contra-bias force. For example, in a latching relay of FIGS. 9–14, if the foreign elements 205 and 206 are of the permanent magnet type and if foreign element 205 is arranged to pass through the first sensing area on the inner side of the control member, it will strengthen the force of pro-bias bond if its polarity is the same as that of the pro-bias magnet and it will weaken the pro-bias force of that bond if it is of opposite polarity. If it weakens the pro-bias force, it operates in the same manner as the soft iron foreign element. If it strengthens that force, it reverses the action which is to say that it causes the armature 200 to move to its first position when the foreign element 205 moves into the first proximity-sensing area. The same thing is true with respect to foreign element 206 and its effect, as a permanent magnet, on the contra-bias force.

In summary, whatever produces the highest pro-bias strength will cause the armature to move to its first position and whatever produces the highest contra-bias strength will cause the armature to move to its second position.

This application is a continuation in part of a parent application filed Sept. 23, 1959 and serially numbered 841,814.

Having described my invention, I claim:

1. An improvement in a proximity device of the magnetic sensing type adapted for use with at least one magnetically permeable foreign element which is movable between different operating positions including one inside and another outside of one magnetic sensing area of the device, comprising:

(A) a pivotally mounted magnetically permeable control member; and (B) magnetic means providing magnetic polls of one sign adjacent said armature, magnetic poles of opposite sign remove from said armature, and at least one sensing area of one sign adjacent said armature,
  (1) said means including
    (a) a permanent pro-bias magnet providing a pro-bias magnetic bond of said one sign which attracts the armature in one pivotal direction toward a first position; and
    (b) a permanent contra-bias magnet providing a contra-bias magnetic bond of the same one sign which attracts the armature in the opposite pivotal direction toward a second position.

2. A proximity device of the magnetic sensing type adapted for use with a magnetically permeable foreign element means which is movable between different operating positions including one inside and another outside of one magnetic sensing area of the device, comprising:
  (A) a magnetically peremeable control member having at least one free end portion;
  (B) magnetic means providing a magetic field of the permanent type,
    (1) said means including a permanent pro-bias magnet having a first pole of one magnetic sign and a second pole of opposite magnetic sign; and
  (C) means movably mounting said control member and stationarily mounting said magnetic means in operative relationship with each other wherein
    (1) said control member is located
      (a) near said first pole, and
      (b) remote from said second pole,
    (2) said control member has its free end portion arranged near said first pole for movement toward and away therefrom between first and second positions
      (a) which are remote from any permanent magnetic pole of opposite sign,
    (3) said pro-bias magnet provides, for said control member, a first pro-bias magnetic bond of said one sign
      (a) which is remote from any permanent magnetic pole of opposite sign, and
      (b) which urges the control member toward one of its positions, and
    (4) said pro-bias magnet provides, for a foreign element, an operative first proximity sensing area
      (a) which is in the vicinity of said first pole, and
      (b) which is remote from any permanent magnetic pole of opposite magnetic sign; and
  (D) contra-bias means
    (1) providing a yieldable contra-bias force urging the control member toward its other position and
    (2) cooperating with said pro-bias magnet to cause said control member
      (a) to move into one of its positions when a foreign element moves into one operating position and
      (b) to move into the other of its positions when a foreign element moves into another operating position.

3. The device of claim 2 wherein:
(A) said control member comprises an armature presenting oppositely disposed outer and inner faces; and
(B) said pro-bias magnet has at least one operative portion of its said first pole positioned adjacent said armature on the inner face side thereof.

4. The device of claim 3 wherein:
(A) said contra-bias means comprises a relatively stationary permanent magnet providing another first pole of said one fixed magnetic sign and having at least one operative portion thereof positioned near said armature to establish, between said other first pole and said armature, a contra-bias magnetic bond of said one sign providing said yieldable contra-bias force.

5. The device of claim 4 wherein:
(A) said armature has a pro-bias end portion and a contra-bias end portion on opposite sides of its mid-portion and is mounted at its mid-portion for pivotal movement between said first and second positions;
(B) said pro-bias magnet has its said operative first pole portion and first pro-bias magnetic bond on the inner face side of the pro-bias end portion of the armature; and
(C) said contra-bias magnet has its said operative other first pole portion and contra-bias magnetic bond on the inner face side of the contra-bias end portion of the armature.

6. The device of claim 5 wherein:
(A) said device includes a frame;
(B) said armature is pivotally mounted on said frame;
(C) said pro-bias magnet is stationarily mounted on said frame; and
(D) said contra-bias magnet is stationarily mounted on said frame.

7. The device of claim 6 wherein:
(A) said frame includes a non-magnetic housing providing a housing chamber; and
(B) said armature is located within said housing chamber.

8. The device of claim 7 including:
(A) means hermetically sealing said housing chamber which contains said armature.

9. The device of claim 7 wherein:
(A) said housing has an outer wall;
(B) said armature is positioned between said outer wall of the housing and said first pro-bias and said other first contra-bias magnetic poles of said one sign; and
(C) at least one operative portion of said first magnetic proximity-sensing area extends along the outer side of said outer housing wall.

10. The improvement of claim 1 wherein:
(A) the pro-bias bond of one sign is operative, in the absence of a foreign element from said one sensing area of said one sign adjacent said armature, to attract said armature to and yieldably hold it in said first position; and
(B) the contra-bias bond of the same one sign is operative, when the foreign element enters said one sensing area, to attract said armature to and yieldably hold it in its second position.

11. The improvement of claim 1 including:
(A) electrical switch means operatively associated with said armature including a switch contact arranged between said armature and one of said magnets for movement by the armature between switch open and switch closed positions which are located in one of said magnetic bonds.

12. The device of claim 2 for use as a latching or maintained position device wherein:
(A) said contra-bias means comprises a relatively stationary contra-bias magnet providing another first magnetic pole of said one fixed magnetic sign and having at least one operative portion of said other first pole positioned near said control member to establish a contra-bias magnetic field having a second proximity-sensing area and providing a contra-bias magnetic bond of said one sign between said other first pole and said control member,
  (1) said contra-bias bond continuously urging said control member in the direction of its second position with a yieldable contra-bias force,
    (a) of a low range of contra-bias strength when said foreign element is in that particular one of said sensing areas which corresponds to the higher of said ranges of pro-bias strength, and (b) of a relatively high range of contra-bias strength when said foreign element is in the other of its sensing area positions, (2) the contra-bias force of the higher of said ranges of contra-bias strength being effective to move said control member toward and hold it in its second position; and (B) said second sensing area and contra-bias magnetic bond being remote from any permanent magnetic pole of opposite sign.

13. The device of claim 12 wherein:

(A) said control member comprises an armature, which presents oppositely disposed outer and inner faces, which has a pro-bias end portion and contra-bias end portion on opposite sides of its mid portion, and which is mounted in its mid portion for pivotal movement between said first and second positions;

(B) said pro-bias magnet comprises a permanent magnet with its operative first pole portion and first pro-bias magnetic bond on the inner face side of the pro-bias end portion of the armature;

(C) said contra-bias magnet comprises a permanent magnet with its operative other first pole portion and contra-bias magnetic bond on the inner face side of the contra-bias end portion of the armature; and (D) said first sensing area and second sensing area are located respectively adjacent the pro-bias and contra-bias end portions of said armature.

References Cited in the file of this patent

UNITED STATES PATENTS

| | | |
|---|---|---|
| 1,743,478 | Pratt | Jan. 14, 1930 |
| 2,235,104 | Greenly | Mar. 18, 1941 |
| 3,022,398 | Abel | Feb. 20, 1962 |
| 3,065,318 | Prince | Nov. 20, 1962 |
| 3,067,305 | Stout et al. | Dec. 4, 1962 |